Jan. 20, 1970      B. W. BRUNSON ET AL      3,490,321
CROSS SLICER
Filed June 22, 1966      6 Sheets-Sheet 6

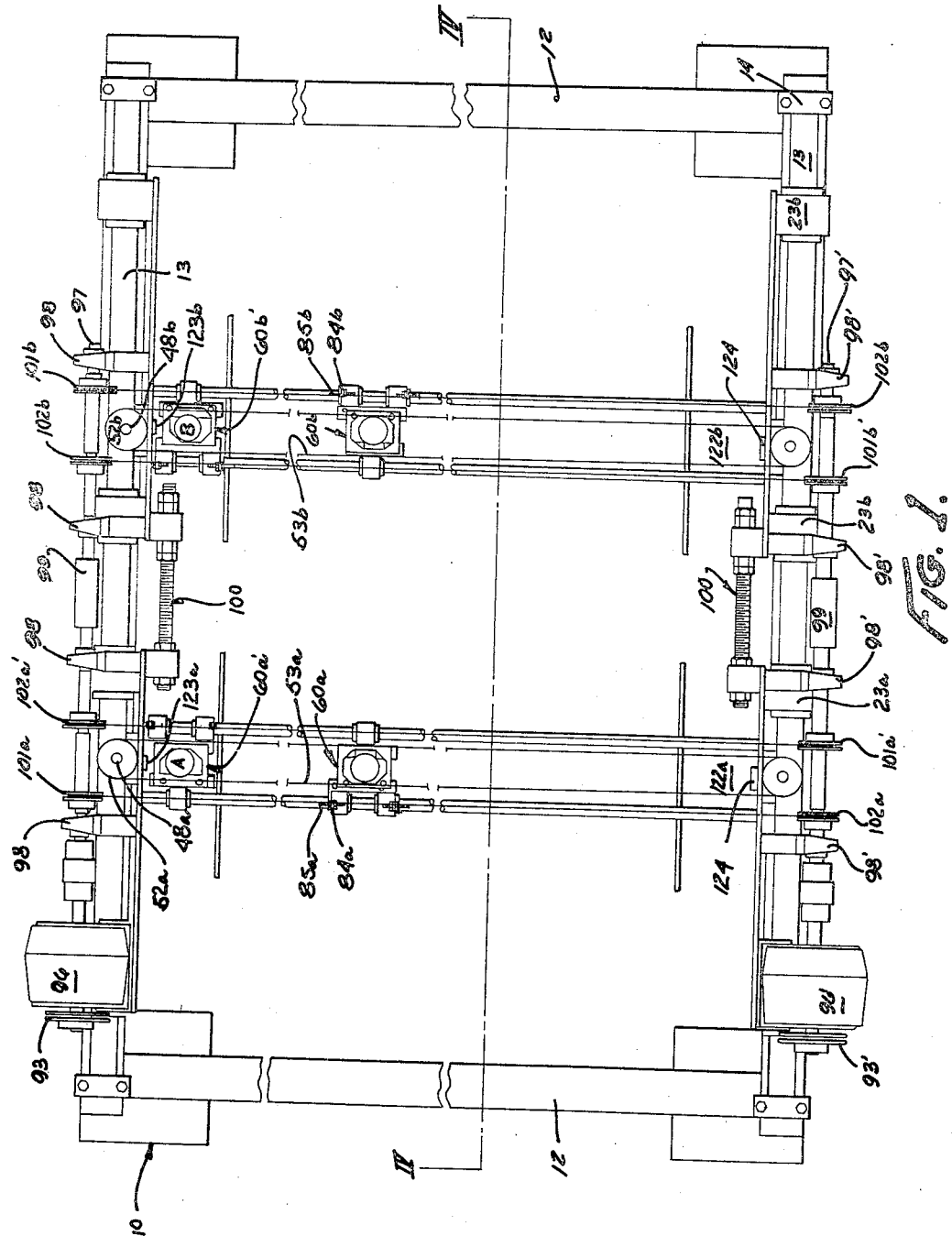

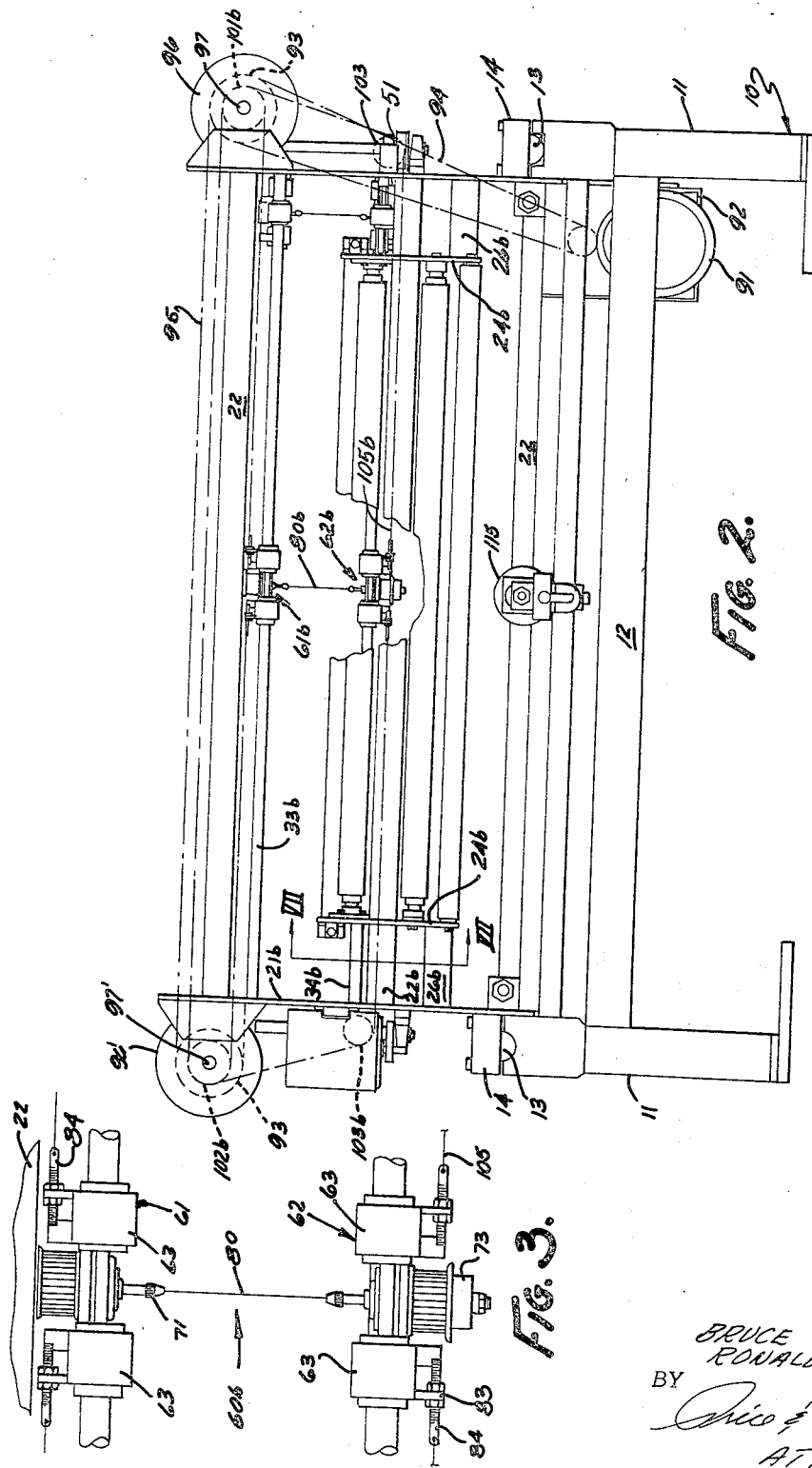

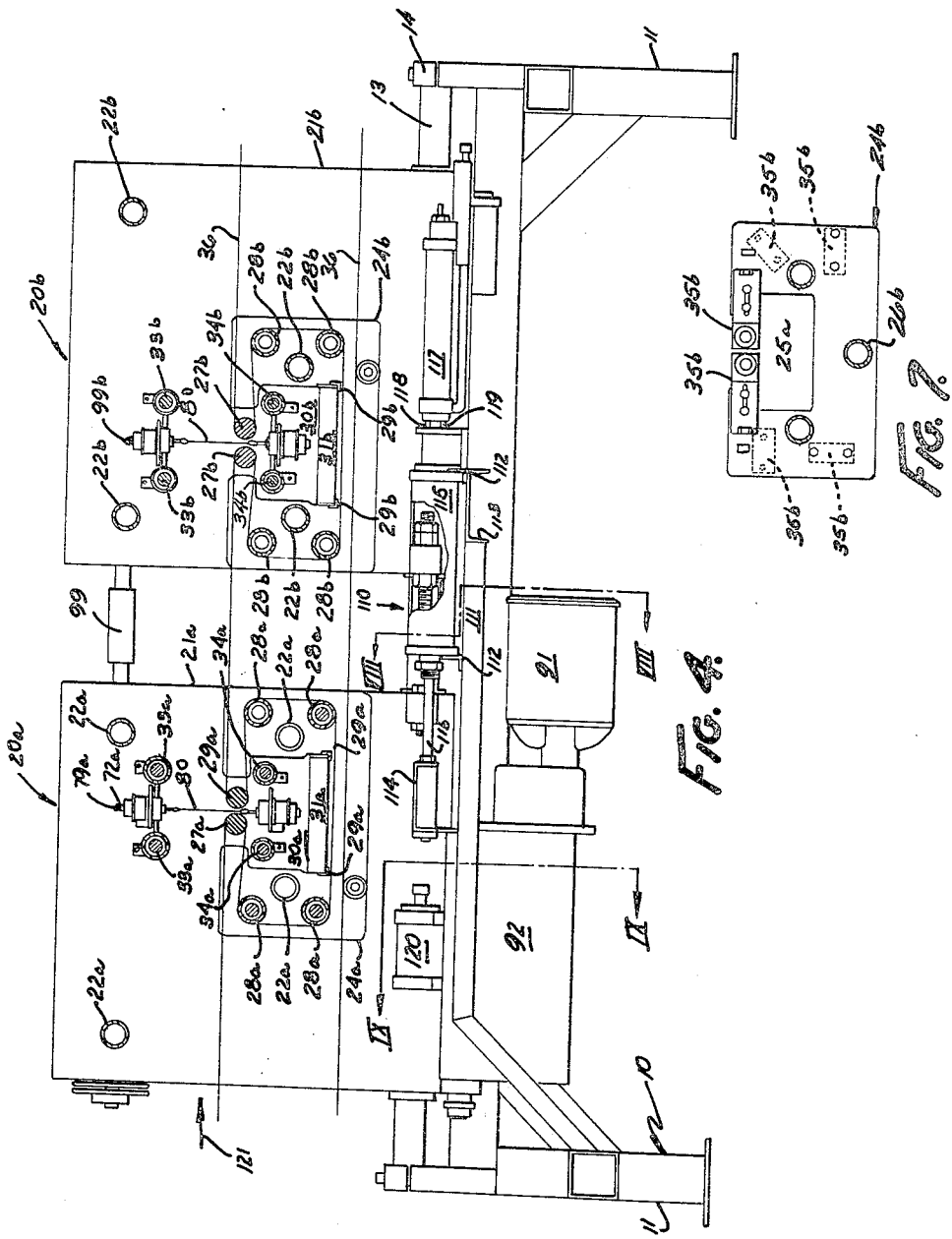

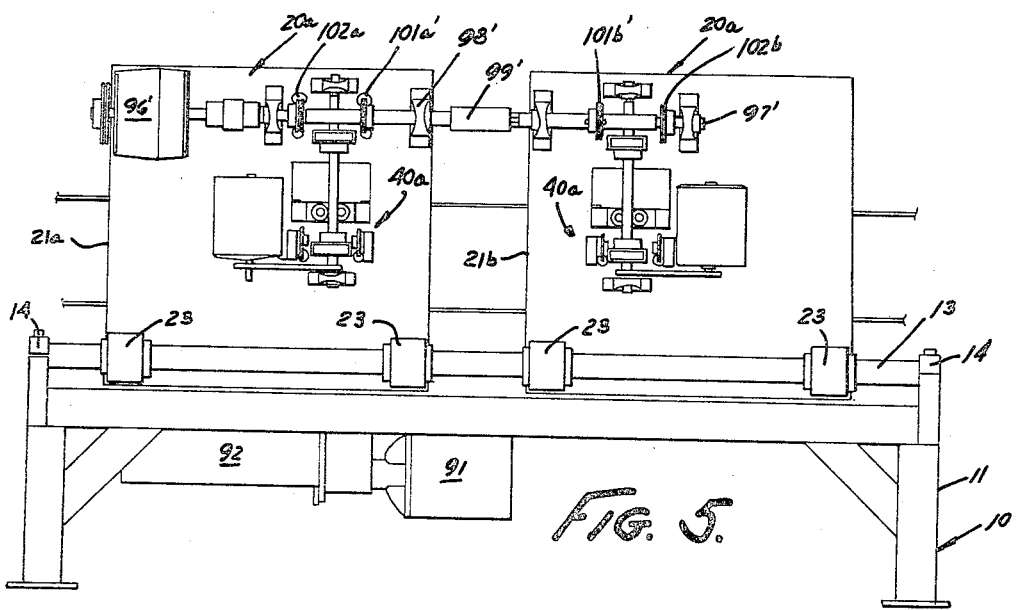
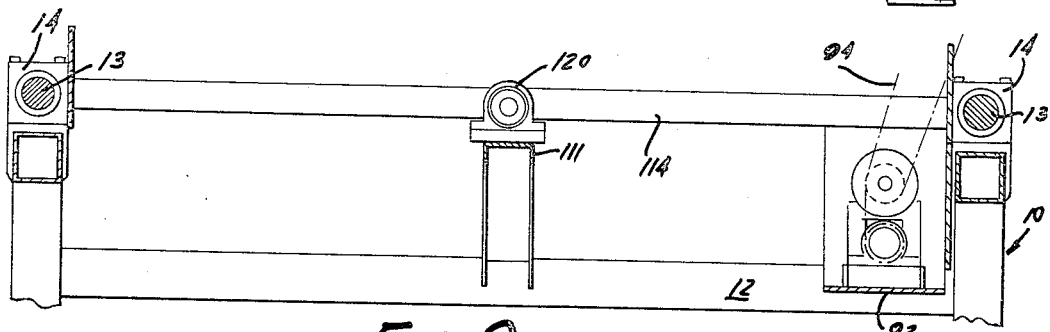
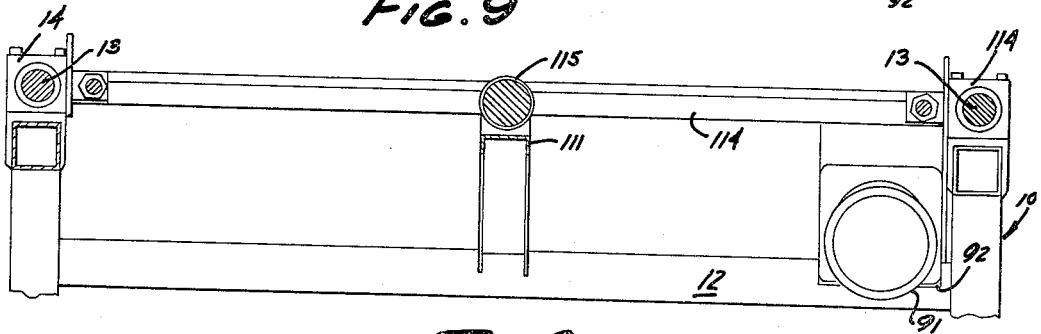

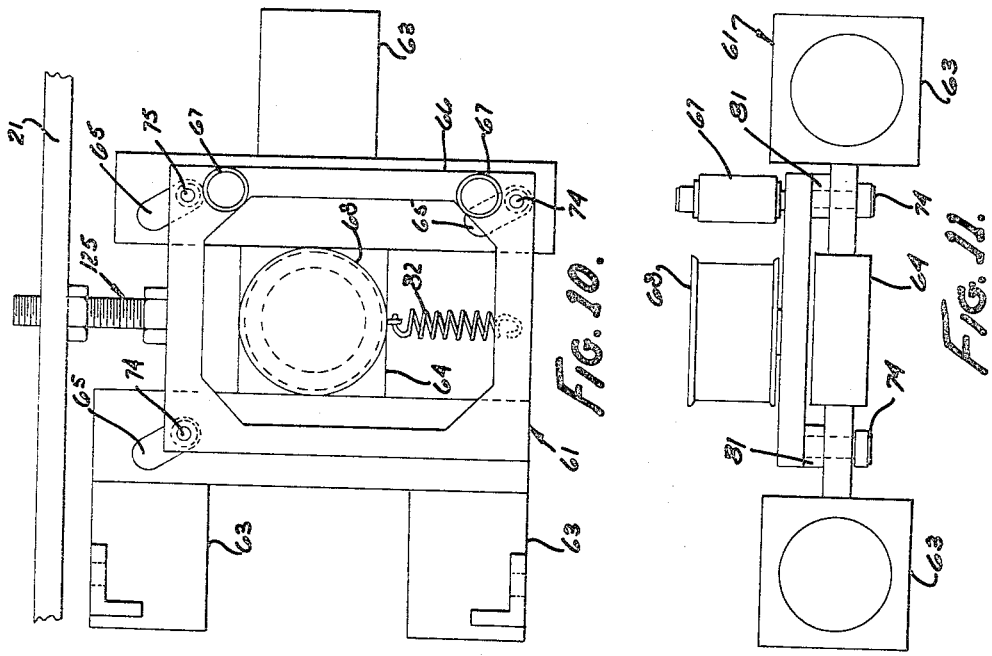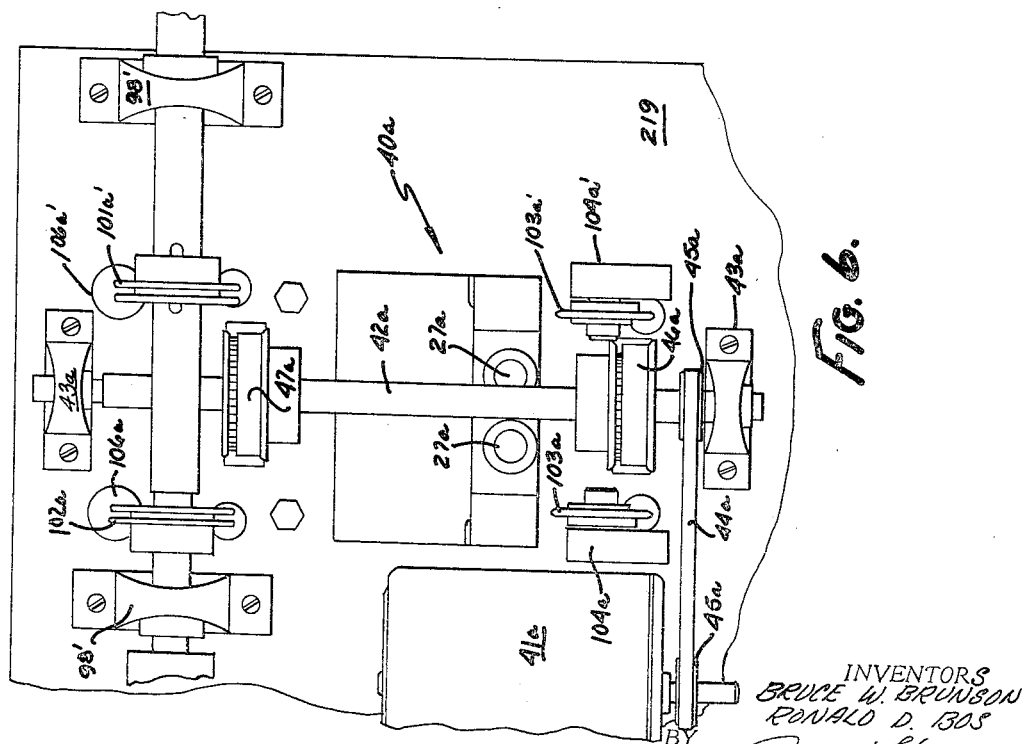

INVENTORS
BRUCE W. BRUNSON
RONALD D. BOS
BY
ATTORNEYS

_United States Patent Office_

3,490,321
Patented Jan. 20, 1970

3,490,321
CROSS SLICER
Bruce W. Brunson, Grand Rapids, and Ronald D. Bos, Jenison, Mich., assignors to Werner Machinery Company, Grand Rapids, Mich., a corporation of Michigan
Filed June 22, 1966, Ser. No. 559,433
Int. Cl. B26d 5/20; B23d 25/00
U.S. Cl. 83—60                          30 Claims

ABSTRACT OF THE DISCLOSURE

A cross slicer particularly adapted for slicing baked goods moving along a conveyor band. The cutter comprises a rotating wire-like member which reciprocates parallel to the path of travel of the goods as well as transverse thereto. The parallel reciprocation of the cutter is synchronized to the movement of the goods such that the cut is made at right angles thereto. Redundant cutter assemblies are provided ready for immediate operation in the event of a failure of one of the primary cutter assemblies.

---

This invention relates to slicers, and more particularly, to a cross slicer particularly adapted for utilization in slicing baked goods traveling along a conveyor band, the slice being made perpendicular to the direction of band travel.

In recent years a number of commercial baking concerns have turned toward assembly line methods of baking as a means of increasing production while decreasing costs. Thus, it is not uncommon to find assembly line devices which are capable of baking and packaging a cake without the cake ever being removed from the conveyor band which carries it through the various baking stations. Many types of baked goods are cooked in rather large quantities and thereafter sliced into appropriate sized portions for packaging and distribution. For example, the batter for a cake may be continually poured onto a conveyor belt resulting in a continuous strip of cake with a width of 5 or 6 feet as indicated in copending application Ser. No. 547,550, filed May 4, 1966 which is assigned to the same assignee as this application. Obviously, these goods must be sectioned prior to packaging and distribution. A number of prior art devices have been designed for performing this function. These devices, however, have not been completely satisfactory for many different reasons.

Initially, it will be noted that the baking environment necessitates a slicing action which is perpendicular with respect to the conveyor band upon which the goods are riding. Also, since the conveyor band preferably is run in a continuous manner, the cross slicer must compensate for the continuous movement of the goods which are being sliced in order that squares or rectangles may be obtained. The prior art slicing devices, as a rule, necessitate a stopping of the conveyor band each time a cross slice is made by some sort of reciprocating mechanism. After that particular slice has been completed, the band is moved in the forward direction until the goods thereon again come into proper slicing alignment. At that point, the conveyor band is again stopped and a slice made.

The problems with systems of this type are evident. If the goods are being baked in a continuous strip operation, the periodic stopping of the conveyor band necessitates a like periodic stopping of the equipment putting the batter onto the belt at the oven, compensation in oven temperatures in order to prevent the cakes from burning and, of course, sophisticated driving systems for the entire conveyor band assembly which are extremely expensive insofar as both initial cost and maintenance are concerned.

Another problem which the prior art devices have not solved arises when a malfunction occurs in one of the cutter blades of the slicing device. For example, if a conveyor type of operation is being utilized, the goods emerge from the oven and move into the cooling section at a prescribed and continuous rate of speed. When one of the slicers malfunctions, it must be replaced as quickly as possible as there is no way in which the assembly line production may be brought to a halt. That is to say, that if the conveyor belt is turned off, the cake then in the oven will be burned. If it is allowed to continue, the slicer, depending on the particular problem, will either have to be bypassed or replaced.

It is an object of this invention to provide a slicing mechanism having a means incorporated therein which continuous strip of baked goods in a direction perpendicular to the path of the conveyor band travel.

It is an object of this invention to provide a slicer mechanism having a means incorporated therein which automatically compensates for the relative movement between the slicing mechanism and the goods being sliced, thus eliminating the necessity for turning off the conveyor band each time a perpendicular slice is made.

It is an object of this invention to provide a slicer mechanism which utilizes a novel type of slicing device which is capable of quickly and cleanly slicing through the goods.

It is an object of this invention to provide a slicer mechanism having redundant slicer assemblies incorporated directly therein whereby the most frequent malfunction—i.e., the breaking or distortion of the slicer mechanism per se—will be automatically sensed and the mechanism automatically replaced.

Similarly, it is an object of this invention to provide a cross slicer mechanism having primary and redundant slicer assemblies which are identical in construction whereby the "primary" and "redundant" designations are freely interchangeable depending upon the particular section which is currently positioned in cutting relationship with the goods.

These and other objects of this invention will be readily understood by reference to the following specification and accompanying figures in which:

FIG. 1 is a fragmentary plan view of the slicer apparatus;

FIG. 2 is a rear-elevational view of the slicer apparatus;

FIG. 3 is a fragmentary, broken, front-elevational view of one of the cutter assemblies;

FIG. 4 is a cross-sectional view taken along plane IV—IV of FIG. 1;

FIG. 5 is a side-elevational view of the slicer apparatus;

FIG. 6 is a fragmentary, side-elevational view of one of the slicing assembly drive mechanisms;

FIG. 7 is a side-elevational view of one of the roller support plates;

FIG. 8 is a cross-sectional view taken along plane VIII—VIII of FIG. 4;

FIG. 9 is a cross-sectional view taken along plane IX—IX of FIG. 4;

FIG. 10 is a fragmentary plan view of one of the cutter assembly support components indicating its operative relationship with respect to the carriage frame;

FIG. 11 is a side-elevational view of the cutter assembly support component shown in FIG. 10;

Figure 12:
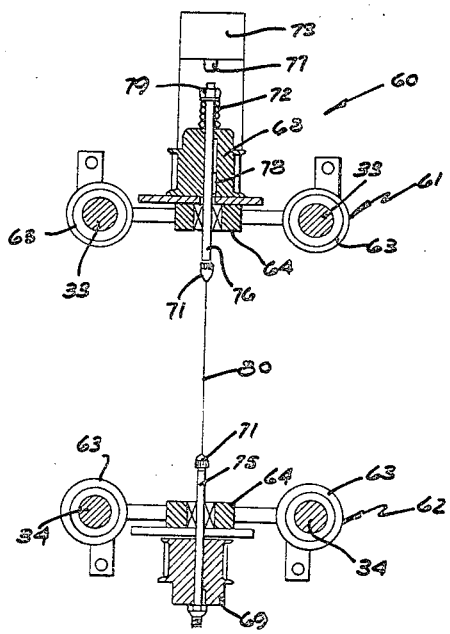
FIG. 12 is a cross-sectional view of one of the cutter assemblies.

Briefly, this invention comprises a framework having a carriage reciprocally supported thereon in such a manner that the carriage may move in a direction parallel to the path of travel of the adjacent sections of the conveyor line. A plurality of cutting means, each consisting of a vertical wire rotatably mounted within the carriage are positioned on a support structure which is capable of being slid across the carriage in a direction perpendicular to the path of travel of the adjacent sections of the conveyor band.

An elongated jug-shaped depression is provided in the conveyor belt wherethrough the lower supporting structures for the rotating wires may travel. Means are provided for continuously rotating the cutting wires, moving their supporting structures back and forth across the conveyor band, and for reciprocating the carriage in a direction parallel to the path of travel of the conveyor band. As one of the wires travels cross-wise with respect to the conveyor band and slices the goods thereon, the carriage is reciprocated so as to compensate for the travel of the goods being sliced. This allows the slice to be made in perpendicular fashion with respect to the strip of goods despite the fact that the conveyor band is not turned off during the slicing operation.

In the preferred embodiment of this invention, the carriage contains two primary slicing assemblies and two redundant slicing assemblies. Means are provided for sensing a malfunction of one of the slicing assemblies, returning that assembly to its home position, and immediately bringing a redundant slicing assembly into operative relationship with respect to the goods being sliced. After the malfunction has been repaired, that particular slicing assembly remains on standby in the event that a malfunction should later occur in the slicer assembly then in operation.

Referring now to the figures, a preferred embodiment of this invention will be described in detail. A support framework indicated generally by the reference numeral 10 consists of a plurality of uprights 11 and horizontal bracing members 12. Affixed to each side of framework 10 and running approximately the entire length thereof, is a tubular support 13 which may conveniently be mounted to the framework 10 by means of end blocks 14 and conventional stud bolts.

Slidably mounted upon tubular supports 13 by means of conventional linear ball bearings 23 are a pair of carriage assemblies 20. The carriage assemblies are substantially identical in nature. Two of them are generally necessary as a means of obtaining sufficiently proximate slices in the goods being processed. As an aid in understanding this disclosure, the carriage assemblies will hereinafter be referred to as forward carriage assembly 20a and rear carriage assembly 20b. The reference characters a and b, in like manner, identify the particular subassemblies and components comprising the forward and rear carriage assemblies, respectively.

Each of the carriage assemblies comprises a pair of end plates 21 which are retained in spaced relationship by a plurality of horizontal supports 22 and, of course, the tubular guides 13. A pair of roller support plates 24, each having an aperture 25 in the faces thereof (see FIG. 7) are positioned within each of the carriage assemblies by any well-known means such as braces 26 and horizontal supports 22. Rotatably mounted to each of roller support plates 24 are two converging band rollers 27 and four spreading band rollers 28. As shown in FIG. 7, the rollers may be mounted on support plate 24 by means of roller mounts 35, thus allowing minor adjustments of the relative position on the rollers once they have been installed. This adjustment, as is well-known, consists merely of a slotted plate to which the roller bearing is mounted, the slots allowing selective positioning of the plate with respect to roller support 24.

As viewed best in FIG. 4, the roller configuration is such that when the band 36 has been threaded therearound an elongated jug-shaped depression 30 is formed therein. The converging band rollers 37 form the mouth of the depression while the spreading band rollers 28 form the body thereof. It will be realized that depression 30 is jug-shaped in one dimension only and that it extends completely across the space between roller support plates 24 in each of the carriage assemblies.

Affixed to each of the end plates 21 and extending therebetween are two upper guide rails 33 and two lower guide rails 34. Conveniently, guide rails 33 and 34 may be tubular in nature. These rails, as will become apparent hereinafter, serve to support the cutting assemblies as they traverse back and forth across the conveyor band.

The cutter rotating assemblies 40 are mounted on the sides of end plates 21. As viewed best in FIGS. 5 and 6, these assemblies consist of a motor 41 which drives a vertical shaft 42 by means of V belt 44 and pulleys 45. Shaft 42 is suitably borne by bearings 43. Mounted on vertical shaft 42 are a lower drive sprocket 46 and an upper drive sprocket 47. On the opposite sides of each of the carriages from rotating assemblies 40 is positioned an idler assembly consisting of a vertical idler shaft 48 having an upper idler sprocket 52 and a lower idler sprocket 51 rotatably mounted thereto. The upper and lower sprockets are horizontally aligned such that an upper drive belt 53 and a lower drive belt (not shown) may rotate thereacross. Of course, suitable apertures are provided in side plates 21 to permit passage of the upper and lower drive belts 53 and 54 therethrough.

Slidably mounted upon each of the upper guide rails 33 and lower guide rails 34 are a pair of cutter assemblies indicated generally by the reference numeral 60 (see FIGS. 1, 3 and 12). One of each pair of these cutter assemblies is primary while the other is redundant. That is to say, that one of each of the pairs of cutter assemblies is always maintained in standby or rest position should a malfunction occur in the cutter assembly then working. The redundant sections of the machine, for purposes of clarity in this description, will be delineated by a prime (') after their respective reference numerals. It will be understood that the "primary" and "redundant" designations are determined merely from the position of the cutter assemblies as shown on the drawings. In actual operation, whichever of the two sets of cutter assemblies were not working at a particular time would be properly classified as redundant while those that were working would be properly classified as primary. As will become apparent hereinafter, when a change of cutter assemblies is necessitated, the new cutter assembly continues the cutting operation until such time as it may happen to incur an operational malfunction.

Referring to FIGS. 2, 3 and 12 particularly, the details of the cutter assemblies, which are all substantially identical in nature, will be described. The cutter assembly is supported by an upper support plate 61 and a lower support plate 62. Three triangularly disposed linear bearings 63 slidably suspend the upper support 61 and the lower support 62 with respect to upper guide rails 33 and lower guide rails 34 respectively. As shown best in FIG. 1, primary upper and lower support plates 61 and 62 are reversed with respect to redundant support plates 61' and 62' as regards their orientation on upper and lower guide rails 33 and 34. The purpose of this reversal will become obvious hereinafter.

Upper and lower supports 61 and 62 each incorporate a bearing block 64 integral therewith. Rotatably mounted within these blocks by means of conventional bearings, bearings 70 are an upper timing pulley shaft 76 and a lower timing pulley shaft 75. An upper timing pulley 68 and a lower timing pulley 69 are affixed to the shafts for rotation therewith. Facing extremities of shafts 75 and 76 have conventional chucks 71 mounted thereon. Upper timing pulley shaft 76 is slidably mounted within upper timing pulley 68 by means of a conventional slide key 78 and is biased upwardly by a compression spring 72 bearing against the upper surface of timing pulley 68 and the lower surface of nut 79 on shaft 76. An elongated cutting member 80 of relatively restricted cross section is clamped in each of the chucks 71. Cutting member 80 may be of any number of sizes and shapes. Round steel piano wire having a diameter of approximately 0.018 inch has been found satisfactory. The cutting member is of such length that compression spring 72 is compressed when the upper chuck is affixed to the wire, thus placing wire 80 under tension. Additionally, the compressing of spring 72 pulls nut 79 away from contact 77 of microswitch 73, thus providing an electrical indication of the condition of wire 80. That is to say, that if cutting wire 80 were to break shaft 76 would move upwardly as viewed in FIG. 10, strike contact 77 of microswitch 73, and emit an electrical signal.

Referring now particularly to FIGS. 10 and 11, it will be seen that support plate 61 and 62 are each provided with a plurality of diagonal slots 65. A slidable idler support plate 66 having a cutaway center portion for passage of timing pulley 67 or 68 is mounted upon each of the upper and lower supports 61 and 62 by means of nylon spacers 81 and suitable fasteners 74. The connection of slidable idler support plate 66 to the upper and lower supports 61 and 62 is such that plate 66 is free to slide within diagonal slots 65. Slidable plate 66 has a pair of idler rollers 67 rotatably mounted thereon. A tension spring 82 connects each support plate or bearing block to its associated slidable plate 66 and thus, at all times, urges idler rollers 67 toward their associated timing pulleys.

Referring now particularly to FIGS. 1, 2, 3, 5 and 6, the details of the perpendicular reciprocation drive system will be described. A main drive motor 91 suitably secured to the frame is operatively coupled to a forward and reverse clutch 92. The mechanical details of clutch 92 are well known in the art. It selectively converts the unitary directional thrust of motor 91 into oscillating rotational forces going first in a clockwise direction, and then in a counterclockwise direction.

Forward and reverse clutch 92 is rotatably connected to pulleys 93 and 93' by means of a power belt 94 and an idler belt 95. Pulleys 93 and 93' transfer their rotational thrust to clutches 96 and 96' respectively which are preferably electrically activated. Shafts 97 and 97' extend along the sides of the machine and are borne thereon by bearing blocks 98 and 98'. Each of the shafts has a slidable coupler 99 in its train so as to allow adjustment of the relative spacing between carriage assemblies A and B by means of adjustment assemblies 100.

Upper redundant drive sprockets 101a' and 101b' are affixed to shaft 97' for rotation therewith. Upper idler pulleys 102a and 102b are mounted on shaft 97' but freely rotatable with respect thereto. Upper drive sprockets 101a and 101b are mounted for rotation with shaft 97. Upper redundant idler pulleys 102a' and 102b' are mounted upon shaft 97 but freely rotatable with respect thereto. Positioned below the upper drive and idler pulleys 101 and 102 on each side of the machine are a plurality of lower idler pulleys or sprockets 103 and 103'. A plurality of apertures 106 are cut into side walls 21a and 21b in line with the peripheries of the various drive and idler pulleys so as to allow the various timing belts to traverse across the apparatus.

The drive chains which preferably comprises standard roller chains are connected to the cutter assemblies and their respective drive and idler sprockets and pulleys by initially affixing them to one of the lugs 84 affixed to depending nipples 83 of one of the sliding supports 61. Tracing the threading of drive chain 105b in FIG. 2, and beginning on the left-hand side of the lower support plates 62b, it will be seen that the chain passes around lower idler pulley 103b, over upper idler pulley 102b, across the machine and over upper drive sprocket 101b, around upper drive sprocket 101b and back to the upper right-hand lug 84 of the upper sliding support 61b. The chain continues from the left-hand lug of upper support plate 61b, back around upper idler pulley 102b, back across the machine to upper drive sprocket 101b, down around lower idler pulley 103 and back to the right-hand lug of lower sliding support 62b. The upper drive and idler pulleys incorporate two tracks to prevent jamming of the drive chains within their respective sprockets (see FIG. 6). The remainder of the cutter assemblies, both redundant and primary, are cabled in an identical manner.

The reverse relationship of the primary and redundant support plates allows this scheme of cabling or chaining to be executed. As shaft 97 is rotated the above outlined cabling scheme causes upper support plate 61b and lower support plate 62b to move across the machine on upper and lower guide rails 33b and 34b respectively. The two sliding supports are servoed by the wires such that their chucks 71 always remain in aligned vertical relationship with respect to one another. From FIG. 1, it will be seen that as shaft 97 is oscillated, cutter assemblies 60a and 60b likewise oscillate back and forth across their respective carriage assemblies. Similarly, assuming cutter assemblies 60a and 60b to have been moved out of the way, as shaft 97' is oscillated, cutter assemblies 60a' and 60b' oscillate back and forth across their respective carriages.

The carriage reciprocating assembly indicated generally by the reference numeral 110 (see FIGS. 2, 4, 5, 8 and 9) consists of a longitudinal frame member 111 supported at one end by a horizontal frame member 113 and at the other end by the apparatus frame (see FIG. 4). A pair of shoulders 112 is positioned on members 111 and 113 for immovably receiving an air cylinder 115. Cylinder 115 has its connecting rod 116 affixed to horizontal carriage member 114. Cylinder 115 is of the two-way type. That is to say, it is capable of operating both in the forward and reverse directions.

Expansion and contraction rates of air cylinder 115 are controlled by a self-contained hydraulic cylinder 117. The piston of cylinder 117 is slaved to the piston of cylinder 115 by connecting rods 118 and 119. Cylinder 117 is well-known in the art. It functions to control the rate of expansion of cylinder 115 as well as providing a "quick return," once the forward path of travel of the carriages has been terminated. Of course, suitable air supply and control means (not shown) are provided for cylinder 115. A shock absorber 120 is affixed to longitudinal frame member 111 and serves to cushion the carriage during the quick return of cylinder 115.

OPERATION

As shown best in FIG. 4, the cake or other type of goods to be cut travels through the machine from left to right as indicated by arrow 121—i.e. first through the a section and then through the b section of the carriage assembly. The cake travels on band 36 which is continuous throughout the entire cross slicing machine. The band passes over one of the converging band rollers 27a, loops around the four spreading band rollers 28a, and again passes around the facing converging band roller 27a to form elongated jug-shaped depression 30a. Similarly, the band passes around converging band roller 27b, around the four spreading band rollers 28b, and back around converging roller 27b to form elongated jug-shaped depression 30b. As noted previously, the jug-shaped depressions 30 provide a path whereby the lower sections of the cutter assemblies 60 may traverse back and forth across the carriage assemblies without interfering with the travel of conveyor band 36. The cutter wires 80 pass through the spaces between converging band rollers 27 such that the cake or other baked good riding along band conveyor 36 passes into operative relationship therewith as it is transferred between the converging band rollers.

Again referring specifically to FIG. 4, it will be noted that as carriage assemblies 20a and 20b are reciprocated parallel to the path of band travel by reciprocating assembly 110, the jug-shaped depressions 30a and 30b are retained. This is possible because all of the band rollers 27 and 28 are merely idlers and they rotate at different speeds depending upon whether the carriages are being reciprocated in one direction or the other or are stationary. The air cylinder control 117 operates air cylinder 115 at a speed equal to the speed of conveyor band 36 during the cutting cycle. That is to say, that during the period that cutter assemblies 60 are traveling crosswise with respect to the path of band travel and thus making a cut, cylinder 115 moves carriage assemblies 20a and 20b in the direction of band travel at such a speed that the cut will be perpendicular to the edge of the baked good.

As shown in FIGS. 1 and 2, the upper and lower guide rails 33 and 34 are positioned such that the cutter assemblies 60a and 60b riding thereon have their upper and lower timing pulleys 68 and 69 pulled into operative engagement with upper and lower timing belts 53 and 54 by idler rollers 67 on slidable idler support plates 66. Since the upper and lower timing belts 53 and 54 associated with each cutter assembly are being positively driven in timed relationship with respect to one another by driving assemblies 40a and 40b, there is no possibility that the upper and lower timing pulleys 68 and 69 of one particular cutter assembly may rotate at different speeds. The criticality of this timing system is self-evident. Any differential speed between the upper and lower timing pulleys of an individual cutter assembly 60 would cause the cutter wire 80 to twist and eventually fracture. The upper and lower drive sprockets 46 and 47, the upper and lower timing pulleys 68 and 69, and the upper and lower timing belts 53 and 54 are matingly notched in a well-known manner as a means of positively preventing the cutter assemblies from getting out of time.

Motor 91 drives periodically reversing clutch 92 such that sprockets 96 and 96' rotate in first one direction and then the other a peripheral distance sufficient to oscillate cutter assemblies 60 first across the carriage assemblies in one direction and then back across it in the other direction. Clutch 92 also incorporates a timing delay in a well-known manner as a means of making the perpendicular cuts at equal predetermined spacings. Only one of clutches 96 and 96' is activated at any one time. As shown throughout the drawings, clutch 96 is engaged and thus cutter assemblies 60a and 60b are being periodically reciprocated across the path of travel of the conveyor band.

As cutter assemblies 60a and 60b begin their traverse across band 36, cylinder 115 is activated to move carriage assemblies 20a and 20b in the direction of band travel at the same speed the band is traveling so that the finished cut is perpendicular to the sides of the cake or layered baked good. Control 117 regulates this speed during expansion and, after a suitable pause, allows carriages 20a and 20b to be quickly reset to their initial starting positions by air cylinder 115. Shock absorber 120 serves to cushion carriages 20a and 20b on their return trip. After a suitable delay which may be adjustably incorporated within reversing clutch 92, sprocket 96 begins rotating in the opposite direction, thus pulling cutter assemblies 60a and 60b across band 36 in the opposite direction. Again, cylinder 115 causes carriage assemblies 20a and 20b to move in the direction of band travel in order to provide a perpendicular cut. Lugs 84 have previously been adjusted such that the facing chucks 71 of each cutter assembly always remain vertically aligned.

Figure 13:
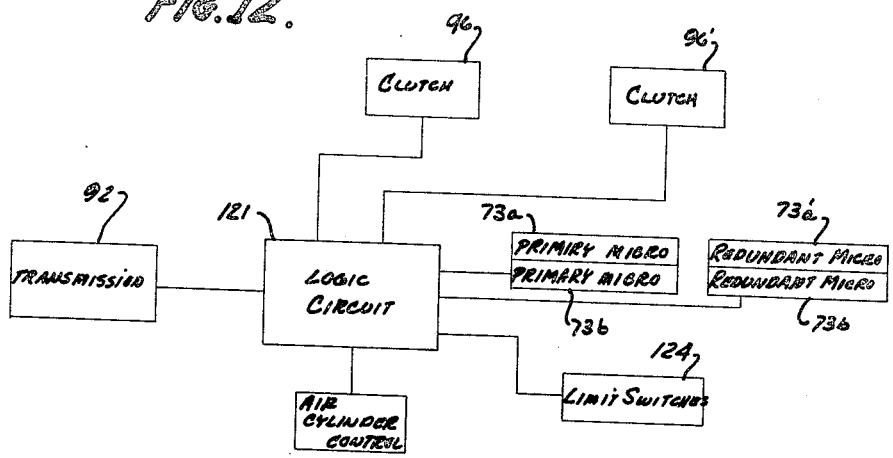
FIG. 13 is a block diagram of a typical electrical circuit which may be utilized in combination with the slicer apparatus.

One of the salutory features of this invention is the automatic replacement of the currently working cutter assemblies in the event that one of the wires 80 should fracture. As pointed out previously, the redundant cutter assemblies and their associated drive means are designated by a prime (') following their respective reference numeral designations. Assume, for example, that cutting wire 80b fractures. This causes shaft 76b to move upwardly under the influence of compression spring 72b. As shaft 76b moves upwardly, it pushes against contact 77b of microswitch 73b. Referring to FIG. 13, this signal is transmitted to a logic section 121 which signals reversible clutch 92 to pull cutter assemblies 60a and 60b into their rest positions 122a and 122b respectively (see FIG. 1). Conveniently, conventional limit switches 124 may be provided adjacent the inner faces of the carriage assemblies to signal logic section 121 when the primary cutter assemblies 60a and 60b have moved into their rest positions. Logic section 121 then deactivates clutch 96 and activates clutch 96'. Suitable means are provided within logic section 121 to correlate the relative movements of clutch 96' and cylinder control 117 such that the redundant cutter assemblies 60a' and 60b' will make their initial traverses in correctly timed relationship with respect to the reciprocation of carriage assemblies 20a and 20b. These particular logic functions and the circuits for performing them are well known in the art and it is not deemed necessary to discuss or illustrate them in detail.

It is desirable that the timing pulleys of the pair of cutting assemblies 60 in standby position be disengaged from the timing belt. This allows the cutting wires to be changed as well as limiting unnecessary wear. As shown in FIGS. 10 and 11, bias springs 82 continuously urge idler rollers 67 toward their adjacent timing pulleys 68 and 69. When timing belts 53 and 54 have been placed in position, this urging causes idler rollers 67 to push them into engaging relationship with their adjacent timing pulleys. Once, however, that a particular set of cutter assemblies are moved into their rest positions, an adjustable stud 125 affixed to plate 21 abutts slidable plate 66 and moves it downwardly and to the right as viewed in FIG. 10 so as to increase the perpendicular distance between timing pulley 68 and idlers 67. As shown best in FIGS. 1, 10 and 11, timing belts 53 and 54 engage timing pulleys 68 and 69 only when idler rollers 67 alter their paths so as to push the timing belts into engaging relationship with the timing pulleys. When slidable plate 66 is moved so as to increase the distance between idler 67 and timing pulleys 68 and 69, the timing pulleys no longer are engaged by their respective timing belts and no longer rotate. Therefore, in the rest position none of the timing pulleys are being rotated. While FIGS. 10 and 11 show only an upper section of one of the cutter assemblies, it is to be understood that each cutter assembly has an identical section at each of its upper and lower extremities, suitable changes being made for right- and left-hand components.

When a failure has occurred in cutter assembly 60a or 60b, the logic and drive sections, as pointed out previously, cause them to be pulled into their rest positions 122. As clutch 96 is deactivated and clutch 96' activated, the redundant cutter assemblies 60a' and 60b' are pulled into working position with respect to the conveyor band by the oscillatory rotation of shaft 97'. As cutter assemblies 60a' and 60b' are pulled from their respective rest positions, their sliding plates 66a' and 66b' leave abutting relationship with studs 125 and their bias springs cause their idler rollers to close on their adjacent timing pulleys. This closing effectively engages the upper and lower timing belts of each carriage section to the redundant cutter assemblies. Cutter wires 80a' and 80b' then begin rotating. While the redundant assemblies 60a' and 60b' are doing the actual cutting, cutter assemblies 60a and 60b may be repaired by replacing their respective cutting wires. Once wires 80a and 80b are replaced, their associated microswitches will notify logic section 121 that they are ready to replace cutter assemblies 60a' and 60b', should a malfunction occur in them. When such a malfunction does in fact occur, logic section 121 is apprised of that fact by microswitch 73a' or 73b'. Logic system 121 then causes reversible clutch 92 to move cutter units 60a' and 60b' into their respective rest positions. It then deactivates clutch 96' and activates clutch 96 in timed relationship to reciprocating cylinder control 117. Again the idler rollers, under the influence of bias spring 82, bring the adjacent timing belts into operative engagement with each timing pulley such that cutting wires 80a and 80b will begin rotation.

It will be obvious to those skilled in the art that for many cutting applications, only one carriage assembly would be necessary. This would be true in the event that the articles were to be sliced into relatively lengthy sections or in the event that the conveyor band were moving very slowly. Such a system could easily be built by utilizing the concepts of this invention as set forth in this specification and the accompanying drawings. Effectively, the only change would be to simply omit one of the carriage assemblies and its associated cutter and roller mechanisms. Suitable timing sequences may be developed by anyone skilled in the art for the various system embodiments suggested by the instant disclosure and drawings.

Thus, this invention has provided a cross cutter assembly which is capable of making clean and regular cuts perpendicular to the path of travel of baked goods on a conveyor band. It will be readily appreciated by those skilled in the art that a number of modifications of the apparatus as disclosed may be executed without departing from the spirit and scope of this invention. These modifications are to be deemed as included in the following claims, unless these claims, by their language expressly state otherwise.

We claim:
1. A cross slitter for slicing baked goods traveling along a conveyor band, said slitter comprising:
   a framework,
   a carriage reciprocally supported by said framework for movement parallel to the path of travel of the adjacent sections of said conveyor band;
   cutting means mounted within said carriage for reciprocating movement across said carriage in a direction perpendicular to the path of travel of said adjacent sections, said cutting means having an elongated cutting member of relatively restricted cross section positioned transverse to the plane of the path of travel of the goods to be slit and having each of its extremities rotatably mounted within said carriage but slidable with respect thereto;
   means for reciprocating said carriage within said framework; and
   means for rotating the upper and lower extremities of said cutting member at identical speeds and in identical directions so as to prevent twisting of said cutting member.

2. The apparatus as set forth in claim 1 wherein said means for reciprocating comprises:
   a two-way air cylinder having one end thereof affixed to said framework and the other affixed to said carriage; and
   means for causing said cylinder to move said carriage from its starting position in the direction of travel of said conveyor band at the same rate of speed that said band is traveling and for returning said carriage to its starting position with relative speed.

3. The apparatus as set forth in claim 1 which further comprises:
   a series of conveyor belt idler rollers rotatably mounted on said carriage perpendicular to the path of reciprocating movement thereof, said rollers being so positioned that a depression having a jug-shaped cross section is formed in the conveyor belt when it is passed therearound, whereby said depression travels with said carriage as it is reciprocated, said wire passing through the mouth of said jug-shaped depression, said means for rotating the lower extremity thereof being positioned within said depression and the means for rotating the upper extremity thereof being positioned above said depression.

4. The apparatus as set forth in claim 1 which further comprises:
   a series of upper and lower guide rails extending across and affixed to said carriage perpendicular to the path of reciprocation thereof;
   upper and lower vehicular supporting structures slidably mounted on said upper and lower series of guide rails respectively, said cutting means being carried by said upper and lower vehicular structures.

5. The apparatus as set forth in claim 4 wherein said cutting means comprises:
   upper and lower drive sprockets rotatably journaled on said upper and lower vehicular structures respectively;
   upper and lower jaws affixed to the facing surfaces of said upper and lower drive sprockets respectively and rotatable therewith; and
   an elongated cutting member of relatively restricted cross-section having one of its extremities engaged by said upper jaw and the other of its extremities engaged by said lower jaw.

6. The apparatus as set forth in claim 5 which further comprises:
   a series of wheels mounted in the general planes of movement of said upper and lower vehicular structures;
   means for rotating at least one of said wheels in oscillatory fashion; and
   motion transfer means interconnecting said upper and lower vehicular structures and said wheels whereby said structures oscillate back and forth across said guide rails in vertical alignment.

7. The combination as set forth in calim 5 which further comprises indexing means for rotating said upper and lower drive sprockets at identical speeds.

8. The apparatus as set forth in claim 7 wherein said indexing means comprises:
   a shaft having notched drive gears affixed to each end thereof rotatably mounted on the sides of said carriage, two of said notched gears lying generally in the plane of said upper drive sprocket and two of said notched gears lying generally in the plane of said lower drive sprocket;
   upper and lower notched drive belts, said upper belt connecting said upper drive sprocket and the two gears lying co-planar therewith and the lower drive belt connecting said lower drive sprocket and the two gears lying co-planar therewith; and
   means for rotating at least one of said shafts.

9. The apparatus as set forth in claim 5 wherein said elongated cutting member is a wire of circuluar cross-section.

10. The apparatus as set forth in claim 5 which further comprises:
   a shaft mounted for rotation with but axially slidable with respect to one of said drive sprockets, one of said jaws being affixed to the end of said shaft between said drive sprockets; and
   spring means axially biasing said shaft outwardly so as to tend to increase the distance between said jaws.

11. The combination as set forth in claim 10 in which the end of the shaft remote from the jaw extends through its associated drive sprocket and which further comprises a microswitch affixed to the associated vehicular structure having its contact adapted to be engaged by said end when said spring means biases said shaft to a predetermined position.

12. The combination as set forth in claim 5 which further comprises:
   tension means for maintaining said cutting member under tension when it is engaged by said jaws.

13. The combination as set forth in claim 12 which further comprises:
   electrical means for sensing when said tension means relaxes and, thus, when said elongated cutting member fractures.

14. A cross slitter for slicing baked goods traveling along a conveyor band, said slitter comprising:
a framework;
a carriage reciprocally supported by said framework for movement parallel to the path of travel of the adjacent sections of said conveyor band;
primary and redundant cutter assemblies mounted within said carriage for reciprocating movement across said carriage in a direction perpendicular to the path of travel of said adjacent sections, said redundant cutter assembly adapted to remain in standby position so long as said primary cutter assembly is operating properly, each of said cutter assemblies having an elongated cutting member of relatively restricted cross-section and upper and lower mounting means for rotatably grasping said cutting member;
means for selectively rotating said elongated cutting members;
means for reciprocating said cutter assemblies; and,
means for reciprocating said carriage within said framework.

15. The apparatus as set forth in claim 14 which further comprises a series of conveyor band idler rollers rotatably mounted within said carriage transverse to the path of reciprocating movement thereof, said rollers being positioned such that an elongated depression is formed in the conveyor band when it is passed therearound whereby said depression travels with said carriage as it is reciprocated, each of said cutter assemblies having cutting means extending into said elongated depression.

16. The combination as set forth in claim 15 wherein:
said lower mounting means is positioned within said depression.

17. The combination as set forth in claim 14 which further comprises:
a series of upper and lower guide rails extending across and affixed to said carriage transverse to the path of reciprocation thereof, said upper and lower mounting means being slidably journalled on said upper and lower guide rails respectively.

18. The combination as set forth in claim 17 which further comprises:
means for oscillating said upper and lower mounting means across said carriage as said carriage is reciprocated; and
means for maintaining associated sets of said mounting means in vertically aligned relationship as they are oscillated.

19. The combination as set forth in claim 18 wherein said oscillating means comprises:
means for oscillating the upper and lower mounting means associated with said primary cutter assembly while said redundant cutter assembly is in a rest position to one side of said conveyor band; and
means for oscillating the upper and lower mounting means associated with said redundant cutter assembly while said primary cutter assembly is in a rest position to the other side of said conveyor band.

20. The combination as set forth in claim 19 wherein said primary cutter assembly oscillating means and said redundant cutter assembly oscillating means are connected to the same oscillating prime mover and each contains an electrically actuated clutch.

21. The combination as set forth in claim 14 wherein said means for selectively rotating said cutter assemblies comprises:
upper and lower drive sprockets rotatably affixed to each of said upper and lower mounting means respectively, each of said cutting members being rotatable with its upper and lower drive sprockets;
upper and lower indexing belts extending across and rotatably borne at each side of said carriage, said upper belt passing adjacent said upper drive sprockets and said lower belt passing adjacent said lower drive sprockets;
means for causing said upper and lower indexing belts to travel in identical directions at identical speeds; and
means for selectively transmitting the thrust of said indexing belts to the upper and lower drive sprockets associated with said primary cutter assembly or to the upper and lower drive sprockets associated with said redundant cutter assembly whereby said elongated cutting members are rotated.

22. The combination as set forth in claim 21 which further includes means at each side of said carriage for deactivating said transmitting means whereby when said redundant cutting assembly is moved to the one side of said carriage, its associated cutting member no longer rotates and whereby when said primary cutting assembly is moved to the other side of said carriage, its associated cutting member no longer rotates.

23. The combination as set forth in claim 21 wherein said deactivating means comprises:
elastic means on said mounting means for biasing said upper and lower drive sprockets into engaging relationship with said upper and lower indexing belts respectively; and
means for overcoming said elastic means and moving the upper and lower drive sprockets associated with said redundant cutter assembly out of engaging relationship with said upper and lower indexing belts when said redundant cutter assembly is moved to one side of said carriage and for moving the upper and lower drive sprockets associated with said primary cutter assembly out of engaging relationship with said upper and lower indexing belts when said primary cutter assembly is moved to the other side of said carriage.

24. The combination as set forth in claim 16 wherein one of said upper and lower mounting means incorporates electronic sensing means, said sensing means adapted to emit a signal in the event that the continuity of said elongated cutting member between said upper and lower mounting means should be interrupted.

25. The combination as set forth in claim 24 which further comprises:
logic means connected to said sensing means, said logic means adapted to activate said redundant cutting assembly when it receives a malfunction signal from said primary cutting assembly, and adapted to activate said primary cutting assembly when it receives a malfunction signal from said redundant cutting assembly.

26. The combination as set forth in claim 24 wherein said logic means comprises:
means for returning the malfunctioning cutter assembly to a rest position at the side of said carriage; and
means for sensing when said malfunctioning cutter assembly has reached the side of the carriage.

27. The combination as set forth in claim 16 wherein one of said upper and lower mounting means includes a compression spring adapted to exert a tension force on said elongated cutting member when it is rotatably grasped by said upper and lower mounting means.

28. The combination as set forth in claim 16 wherein one of said upper and lower mounting means includes slidably mounted shafts having a chuck on the inward extremity thereof adapted to grasp one end of said elongated cutting member, said shaft being outwardly biased whereby a tension force is exerted on said cutting member when it is grasped by said upper and lower mounting means.

29. A cross slitter for slicing baked goods traveling along a conveyor band, said slitter comprising:
a framework;
a carriage reciprocally supported by said framework for movement parallel to the path of travel of the adjacent sections of said conveyor band;
first and second sets of primary and redundant cutter assemblies mounted within said carriage for reciprocating movement across said carriage in a direction perpendicular to the path of travel of said adjacent sections, said first and second sets being mounted so as to be adapted to reciprocate in paths spaced from but parallel to one another, said redundant cutter assemblies adapted to remain in standby position so long as said primary cutter assemblies are operating properly, each of said cutter assemblies having an elongated cutting member of relatively restricted cross section positioned transverse to the plane of the path of travel of the goods to be slit and having at least one of its extremities rotatably mounted within said carriage;

means for rotating said one extremity of said cutting member;

means for reciprocating said cutter assemblies; and means for reciprocating said carriage within said framework.

30. A cross slitter for slicing baked goods traveling along a conveyor band, said slitter comprising:

a framework;

a carriage reciprocally supported by said framework for movement parallel to the path of travel of the adjacent sections of said conveyor band;

a guide rail mounted on said carriage for reciprocating movement therewith, said rail extending transverse to the path of travel of said conveyor band;

primary and redundant cutter assemblies moveably mounted upon said guide rail for reciprocating movement across said carriage in a direction transverse to the path of travel of said adjacent sections, said redundant cutter assembly adapted to remain in standby position on said rail so long as said primary cutter assembly is operating properly and to move along said rail into operative position in the event of a failure of said primary cutter means;

means for reciprocating said cutter assemblies; and means for reciprocating said carriage within said framework.

References Cited

UNITED STATES PATENTS

| | | | |
|---|---|---|---|
| 1,583,188 | 5/1926 | Schumacher | 83—318 |
| 1,959,424 | 5/1934 | Hawkins | 83—479 X |
| 3,064,589 | 11/1962 | Genich | 31—22 X |
| 3,076,369 | 2/1963 | Overman | 83—320 X |
| 3,137,192 | 6/1964 | McNeill | 83—614 X |
| 3,262,348 | 7/1966 | Wiatt et al. | 83—318 X |
| 3,072,004 | 1/1963 | Jenkins | 83—318 |

ANDREW R. JUHASZ, Primary Examiner

U.S. Cl. X.R.

83—318, 353, 646